United States Patent
Song et al.

(10) Patent No.: US 7,068,879 B2
(45) Date of Patent: Jun. 27, 2006

(54) GAIN FLATTENING DEVICE FOR AN OPTICAL FIBER AMPLIFIER

(75) Inventors: Jeong-Hwan Song, Seoul (KR); Oh-Dal Kwon, Kyonggi-do (KR); Jong-Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 10/202,529

(22) Filed: Jul. 24, 2002

(65) Prior Publication Data

US 2003/0059161 A1 Mar. 27, 2003

(30) Foreign Application Priority Data

Sep. 26, 2001 (KR) ........................................ 2001-59786

(51) Int. Cl.
*G02B 6/26* (2006.01)

(52) U.S. Cl. ........................ 385/27; 385/37; 359/337.1
(58) Field of Classification Search ................... 385/27, 385/37, 24; 359/337.1, 337.21, 341.1
See application file for complete search history.

(56) References Cited

U.S. PATENT DOCUMENTS

| 5,740,292 | A | * | 4/1998 | Strasser | 385/37 |
| 5,805,751 | A | * | 9/1998 | Kewitsch et al. | 385/43 |
| 5,953,467 | A | * | 9/1999 | Madsen | 385/15 |
| 6,226,428 | B1 | * | 5/2001 | Saito et al. | 385/42 |
| 6,496,303 | B1 | * | 12/2002 | Fleming | 359/337.1 |
| 6,600,595 | B1 | * | 7/2003 | Aida et al. | 359/341.3 |

* cited by examiner

*Primary Examiner*—Rodney Bovernick
*Assistant Examiner*—Mike Stahl
(74) *Attorney, Agent, or Firm*—Cha & Reiter L.L.C.

(57) ABSTRACT

A gain flattening device for an optical fiber amplifier. In the gain flattening device, a first end portion, having first and second ends, receives an amplified optical signal from a first amplification fiber via the first end. A second end portion, having third and fourth ends, outputs the amplified optical signal to a second amplification fiber via the fourth end. A first connector is included for connecting the first end to the third end. A second connector is included for connecting the second end to the fourth end. At least one reflective grating is further included with a predetermined gain curve at a predetermined wavelength band. An optical coupling portion couples the amplified optical signal from the first connector to the second connector in at least one coupling region where the first and second connectors are closer to each other than in any other area, and outputs part of the amplified optical signal reflected from the reflective grating via the second end.

14 Claims, 6 Drawing Sheets

GAIN FLATTENING DEVICE FOR AN OPTICAL FIBER AMPLIFIER

CLAIM OF PRIORITY

This application makes reference to and claims all benefits accruing under 35 U.S.C. Section 119 from an application entitled "Gain Flattening Device for an Optical Fiber Amplifier" filed in the Korean Industrial Property Office on Sep. 26, 2001 and there duly assigned Serial No. 2001-59786.

BACKGROUND OF THE INVENTION

1. Field of the Invention

The present invention relates generally to an optical fiber amplifier, and in particular, to a gain flattening device for an optical fiber amplifier.

2. Description of the Related Art

Wavelength Division Multiplexing (WDM) optical transmission requires an optical transmitter stabilized in wavelength and output power, a multiplexer (MUX) for multiplexing a plurality of wavelengths, and an optical fiber amplifier having a uniform gain distribution across a multiplexed wavelength band. A requirement for an Erbium-Doped Fiber Amplifier (EFDA) designed for Dense Wavelength Division Multiplexing (DWDM) is to have the same gain and noise characteristic at any wavelength. If optical signals have different gain and noise characteristics, even though multiplexed with the same intensity at any wavelength, the differences in gain and noise are accumulated after multi-stage amplification. This causes a signal-to-noise ratio (SNR) at a particular wavelength to decrease. As a result, a receiver may detect optical signals with a larger error rate variation across the spectrum of wavelengths. In this context, flattening the gain of the EDFA is very desirable in WDM optical transmission. In order to flatten the gain of the EDFA, an interference filter, a chirped Bragg grating, or a long period fiber grating is usually adopted as an end filter for the EDFA.

FIG. 1 illustrates a conventional EDFA having a gain flattening filter. The EDFA amplifies an optical signal that is propagated along an erbium-doped fiber 150 by population inversion of erbium ions. The EDFA includes an optical fiber 110 as a transmission medium. First and second optical isolators 120,180 are included for isolating any feedback light. The erbium-doped fiber 150 is utilized for amplifying optical signals. First and second pumping light sources 140,170 are included for outputting pumping light that excites erbium ions in the erbium-doped fiber 150. Further included, first and second optical couplers 130,160 for coupling the pumping light to the optical fiber 110, and a gain flattening filter 190.

In FIG. 1, a 9-channel optical signal is amplified in the EDFA and it has a non uniform gain distribution across the channels. This implies that the EDFA has a different gain at varying wavelengths. Today's optical communication systems transmit/receive a plurality of channels via one optical fiber in WDM and thus the wavelength spacing between channels is reduced due to limited wavelength bands. Accordingly, if the light intensities of channels are not uniform, the channels are highly susceptible to data loss due to noise or inter-channel interference.

The gain flattening filter 190 at the output of the EDFA flattens the wavelength-gain curve of the EDFA. Long period fiber gratings 195 in the gain flattening filter 190 have a Gaussian-like function gain curve in which a peak value is observed at the central frequency. If the transmitted optical signal uses a narrow wavelength band, a single long period fiber grating 195 is enough to flatten the gain. In the case of a wide wavelength band, a plurality of long period fiber gratings 195 are used in combination.

The conventional EDFA, however, has a shortcoming in that the use of the gain flattening filter 190 as an end filter reduces the gain of the EDFA rather than when it is used as a midway filter. Moreover, since the long period fiber gratings 195 are sensitive to temperature changes, the gain characteristics of the EDFA may deteriorate depending on changes in the ambient environment. Further, if the EDFA uses a reflection filter such as an interference filter and Bragg gratings as a midway filter, it is very difficult to block optical signals reflected from the reflection filter. While an optical isolator can block the reflected light, it is very expensive and thus the cost of the EDFA is increased.

SUMMARY OF THE INVENTION

It is, therefore, an object of the present invention to provide a gain flattening device for an optical fiber amplifier which uses a midway filter for gain flattening, effectively blocking an optical signal reflected from the midway filter.

It is another object of the present invention to provide a gain flattening device for a cost effective optical fiber amplifier that exhibits a merely slight change in output characteristics in response to temperature changes.

The foregoing and other objects of the present invention are achieved by providing a gain flattening device for an optical fiber amplifier. In the gain flattening device, a first end portion, having first and second ends, receives an amplified optical signal from a first amplification fiber via the first end. A second end portion, having third and fourth ends, outputs the amplified optical signal to a second amplification fiber via the fourth end. The gain flattening device also having a first connector for connecting the first end to the third end, a second connector for connecting the second end to the fourth end. At least one reflective grating with a predetermined gain curve at a predetermined wavelength band is included. Further, an optical coupling portion couples the amplified optical signal from the first connector to the second connector in at least one coupling region where the first and second connectors are closer to each other than in any other area, and outputs part of the amplified optical signal reflected from the reflective grating via the second end.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 2:
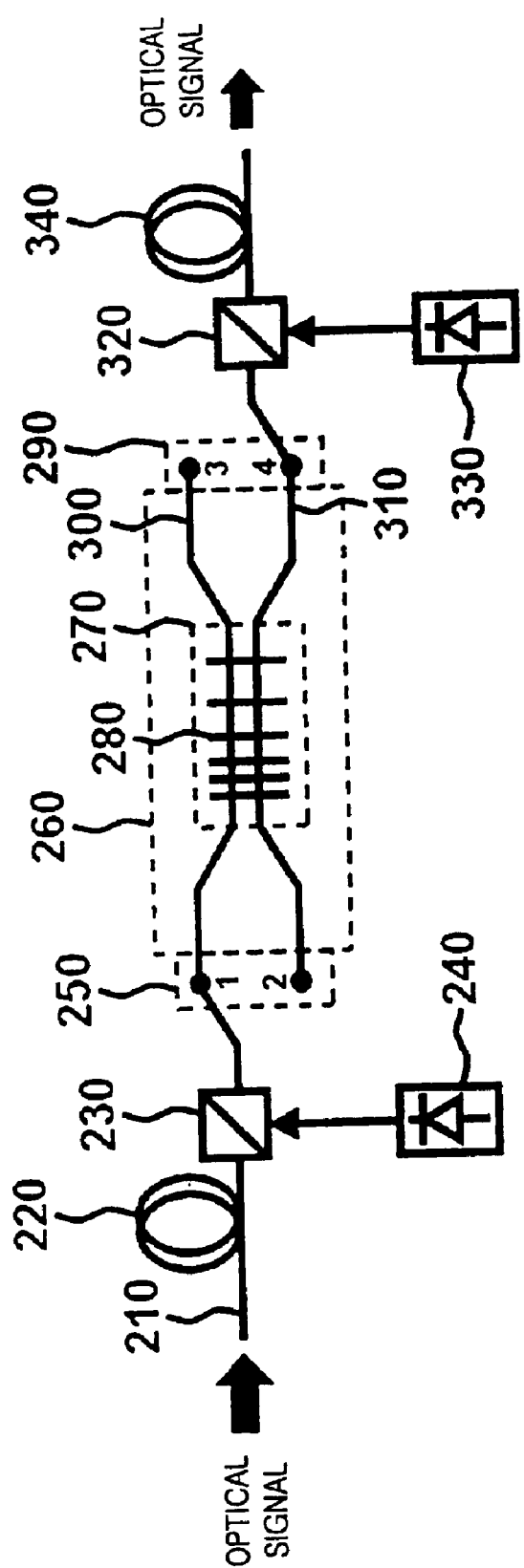
FIG. 2 illustrates an EDFA having a gain flattening device according to a preferred embodiment of the present invention.

FIG. 2 illustrates an EDFA having a gain flattening device according to a preferred embodiment of the present invention. The EDFA includes first and second erbium-doped fibers 220,340, first and second pumping light sources 240,330, first and second optical couplers 230,320, and a gain flattening device 250,260,290 between the first and second erbium-doped fibers 220,340.

The first and second erbium-doped fibers 220,340 amplify an input optical signal by induced emission of excited erbium ions. The first and second pumping light sources 240,330 output pumping light at predetermined wavelengths to the first and second erbium-doped fibers 220,340, respectively. The first and second optical couplers 230,320 couple the pumping light received from the first and second pumping light sources 240,330 respectively to the first and second erbium-doped fibers 220,340. Thus, the first and second optical couplers pass optical signals received from the first erbium-doped fiber 220 and the gain flattening device 250, 260,290. In the EDFA, an input signal is amplified by the first erbium-doped fiber 220 and then applied to the gain flattening device 250,260,290.

Figure 1:
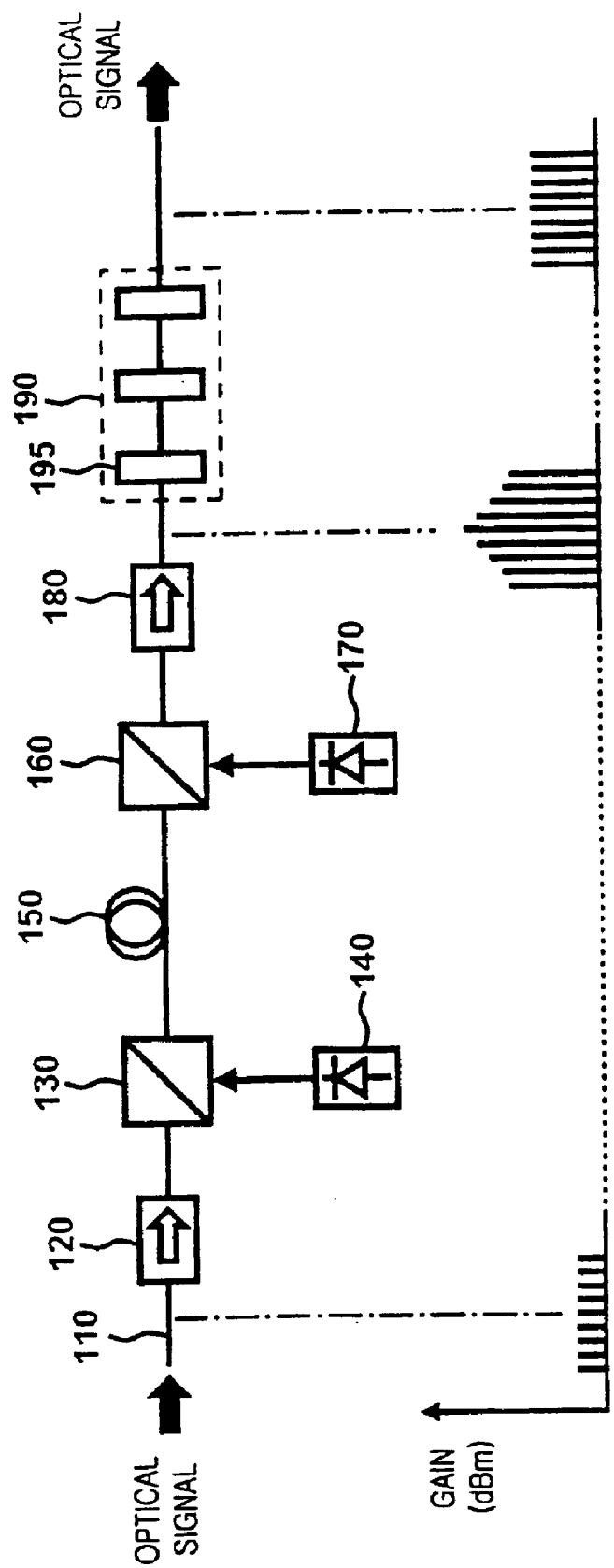
FIG. 1 illustrates a conventional EDFA having a gain flattening filter.
Figure 3:
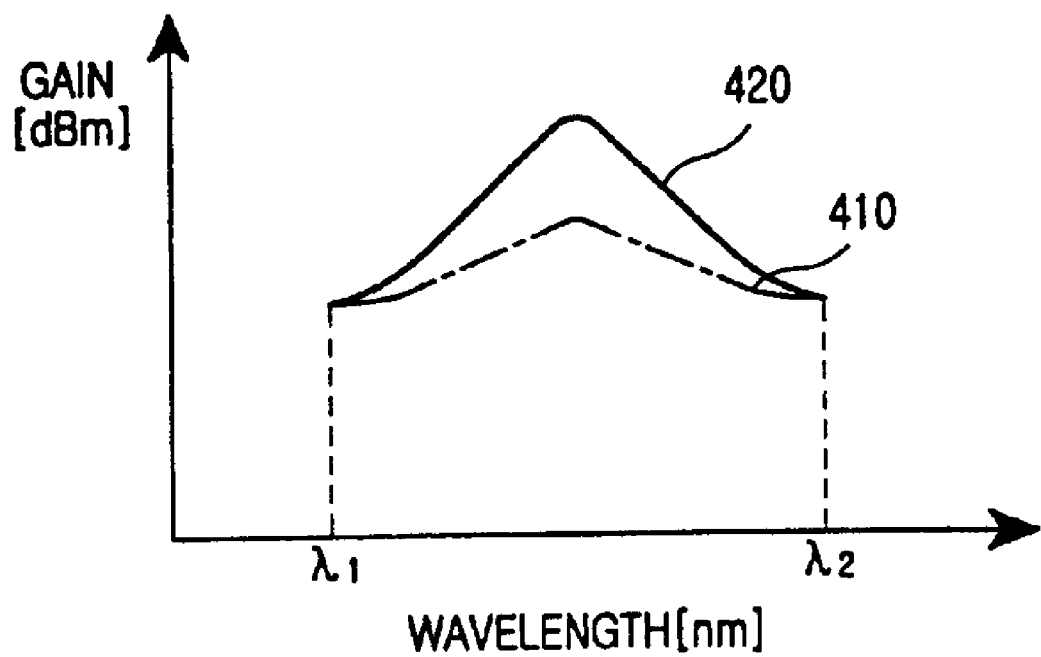
FIG. 3 illustrates the gain curves of first and second erbium-doped fibers illustrated in FIG. 1.

FIG. 3 is a graph showing gain characteristics of the first and second erbium-doped fibers 220,340 illustrated in FIG. 1. Reference numeral 410 denotes the gain curve of either the first or second erbium-doped fiber 220,340, while reference numeral 420 denotes the overall gain curve of both. As illustrated in FIG. 3, even if the wavelength-intensity curves of signals input to the first and second erbium-doped fibers 220,340 are uniform, the non-uniform overall gain curve 420 leads to non-uniform wavelength-intensity curves for amplified optical signals output from the first and second erbium-doped fibers 220,340.

Returning to FIG. 2, the gain flattening device includes an input portion 250, an output portion 290, and an optical coupling portion 260. The gain flattening device 250, 260, 290 may be realized as a planar lightwave circuit (PLC) including a stack of a core and a clad surrounding the core on a semiconductor substrate.

As can be seen, he input portion 250 has first and second ends. During operation, the input portion 250 receives an amplified optical signal from the first erbium-doped fiber 220 via the first end. The first end of the input portion 250 is connected to the first erbium-doped fiber 220. However, the second end of the input portion 250 thereof is not connected to any other device because it functions as a drop end and thus an optical signal applied to the second end is lost. While the second end of the input portion 250 is shown not connected to any other device in FIG. 2, it may be connected to an optical attenuator to prevent an optical signal applied to the second end from influencing nearby devices.

As can be further seen, the output portion 290 has third and fourth ends. During operation, the output portion 290 outputs the amplified optical signal to the second erbium-doped fiber 340 via the fourth end. While the fourth end is connected to the second erbium-doped fiber 340, the third end is not connected to any other device. The third end functions as a drop end similar to the second end.

The optical coupling portion 260 includes a first connector 300 for connecting the first end to the third end and a second connector 310 for connecting the second end to the fourth end. The area where the first and second connectors 300,310 are closer than in any other area is a coupling region 270. The amplified optical signal propagating along the first connector 300 is coupled to the second connector 310 in the coupling region 270. Here, the coupling rate is controlled by adjusting the length of the coupling region 270. In FIG. 2, the length of the coupling region 270 is adjusted in such a way that the coupling rate is almost 100%. That is, the amplified optical signal applied to the coupling region 270 via the first erbium-doped fiber 220 and the first end of the input portion 250 is coupled from the first connector 300 to the second connector 310. Then the coupled optical signal is applied to the second erbium-doped fiber 340 via the fourth end. The second erbium-doped fiber 340 re-amplifies the optical signal received from the fourth end.

Chirped fiber gratings 280 formed in the coupling region 270. The chirped fiber gratings have a grating period that decreases or increases with respect to the grating length, and a predetermined gain curve at a predetermined wavelength band. The chirped fiber gratings 280 reflect part of the input optical signal according to the gain curve and the reflected optical signal is lost at the second end. It is known that the chirped fiber gratings 280 have stable output characteristics versus temperature change.

Typical non-chirped fiber gratings reflect an optical signal in a narrow wavelength band covering the central wavelength and its adjacent wavelengths. Further, such non-chirped fiber gratings exhibit a Gaussian-like function reflectance profile. Let the grating period be $\Lambda$, the effective refractive index of an optical fiber core with respect to the central wavelength be $N_{eff}$, and the central wavelength be $\lambda_B$ is as follows:

$$\lambda_B = 2N_{eff}\Lambda \tag{1}$$

As noted from Equation (1), the wavelength band can be set according to the grating period. A gain at a predetermined wavelength (i.e., a grating period) can be set by controlling the grating length corresponding to the grating period.

Figure 4:
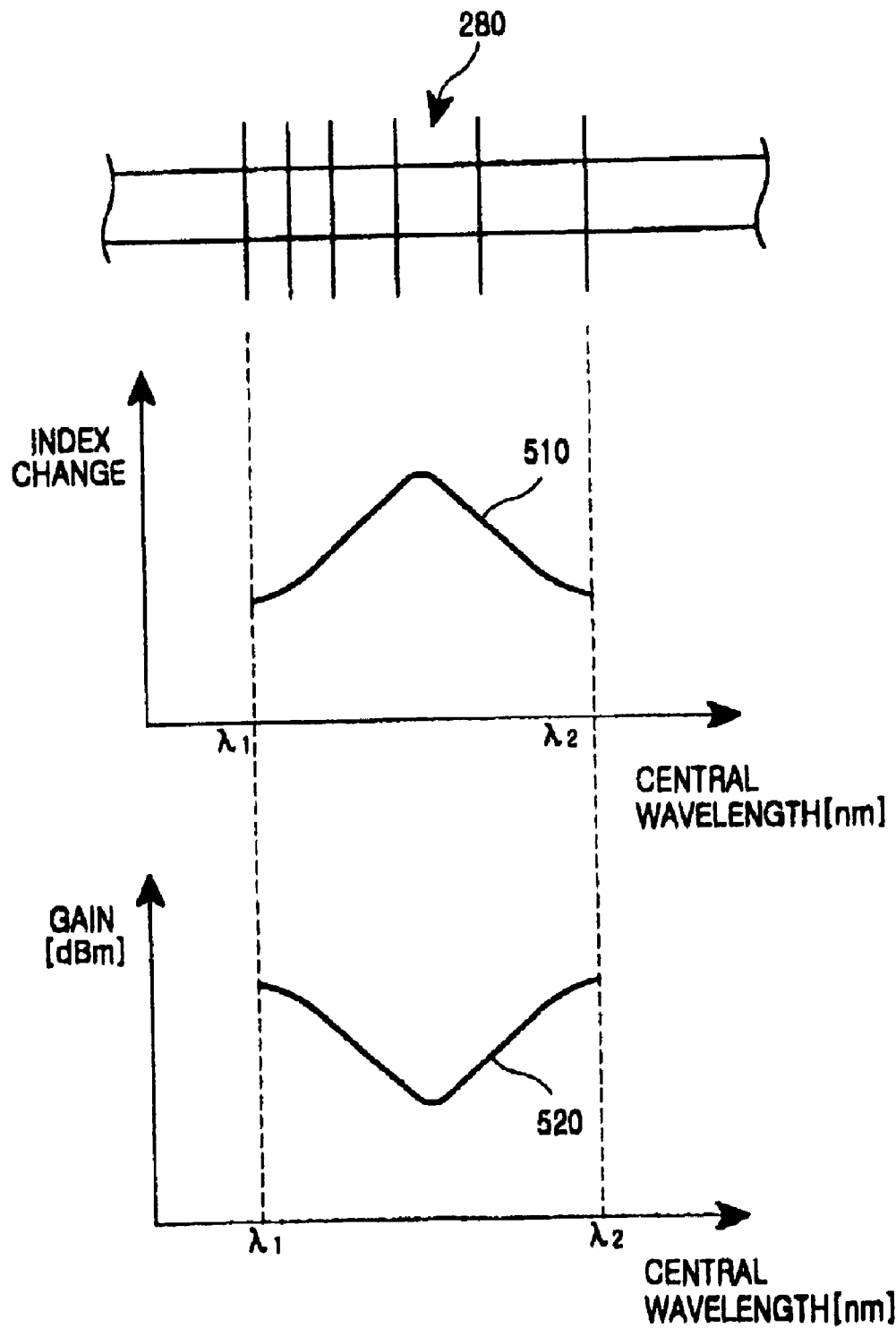
FIG. 4 illustrates characteristics of chirped fiber gratings illustrated in FIG. 2.

FIG. 4 illustrates characteristics of the chirped fiber gratings 280 illustrated in FIG. 2. A central wavelength versus index change rate curve 510 of the chirped fiber gratings 280 is illustrated in FIG. 4. The index change curve is set to be similar to the overall gain curve 420 of the first and second erbium-doped fibers 220 and 340 illustrated in FIG. 3. A central wavelength versus gain curve 520 of the chirped fiber gratings 280 is determined by the index change rate curve 510. Transmittance is expressed in terms of gain herein.

Figure 5:
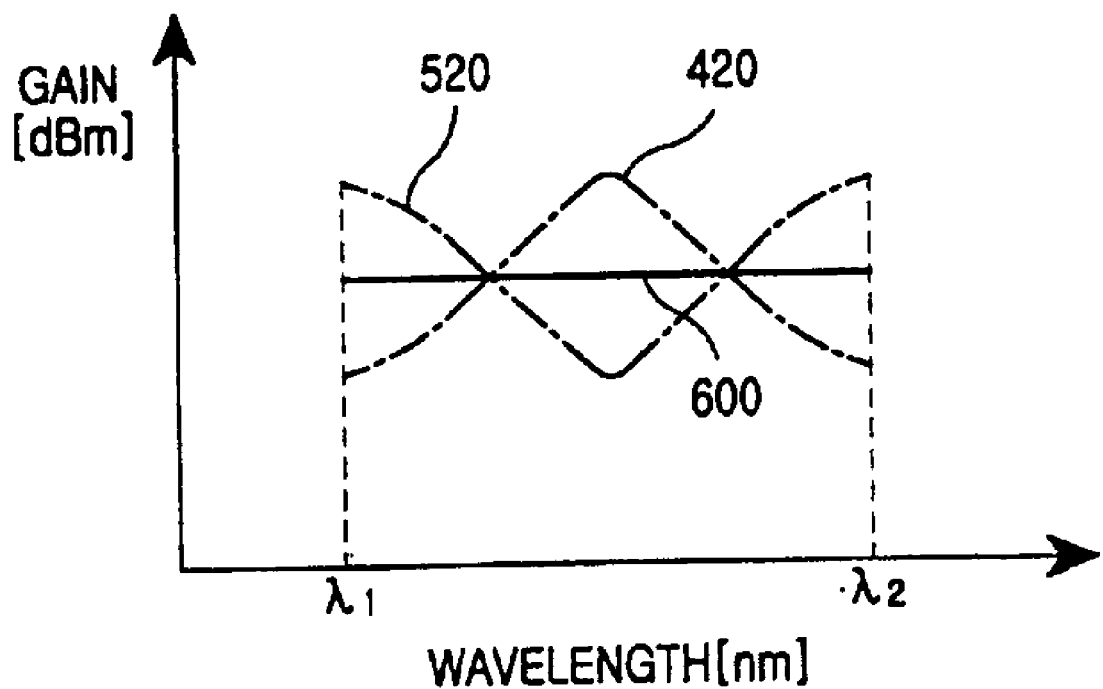
FIG. 5 is a graph showing gains versus wavelengths in the EDFA of FIG. 2.

FIG. 5 illustrates the wavelength versus gain characteristics of the EDFA illustrated in FIG. 2. Referring to FIG. 5, the overall gain curve 420 of the first and second erbium-doped fibers 220,340 overlap with the gain graph 520 of the chirped fiber gratings 280, resulting in a uniform overall gain curve 600 of the EFDA.

Figure 6:
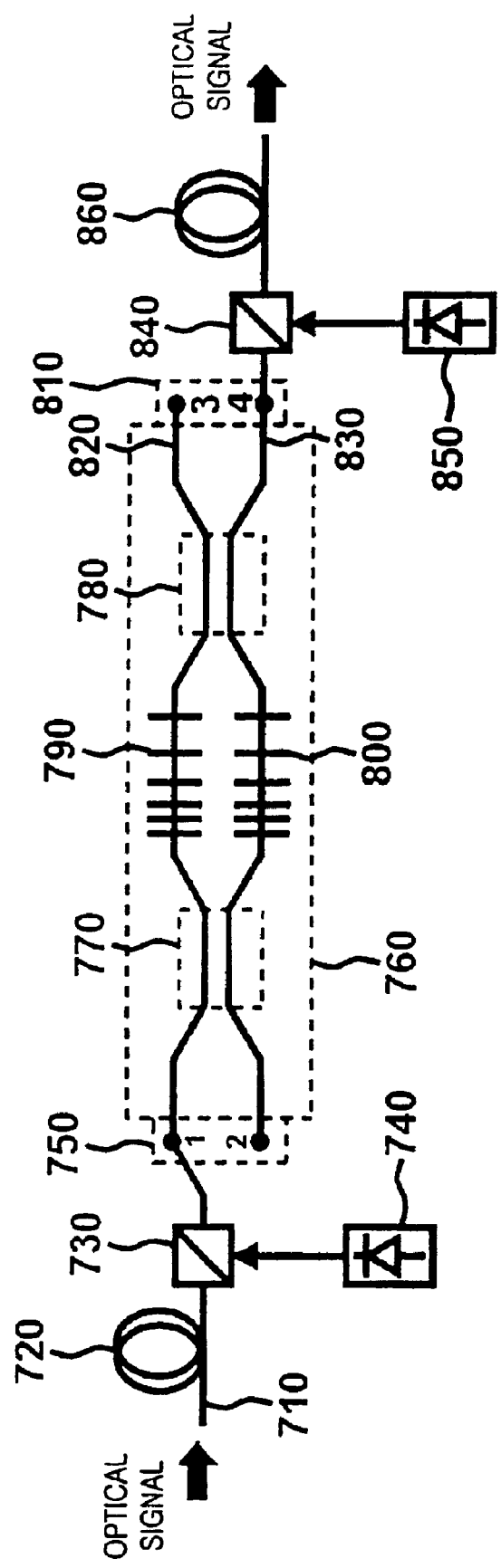
FIG. 6 illustrates an EDFA having a gain flattening device according to another preferred embodiment of the present invention.

FIG. 6 illustrates an EDFA having a gain flattening device according to another preferred embodiment of the present invention. The EDFA includes first and second erbium-doped fibers 720,860, first and second pumping light sources 740,850, first and second optical couplers 730,840, and a gain flattening device 750,760,810 between the first and second erbium-doped fibers 720,860. Only components unique to the EDFA according to the second embodiment of the present invention will be described below.

The gain flattening device includes an input portion 750, an output portion 810, and an optical coupling portion 760. The input portion 750 has first and second ends. During operation, the input portion receives an amplified optical signal from the first erbium-doped fiber 720 via the first end. The output portion 810 has third and fourth ends, and outputs the amplified optical signal to the second erbium-doped fiber 860 via the fourth end.

The optical coupling portion 760 includes a first connector 820 for connecting the first end to the third end and a second connector 830 for connecting the second end to the fourth end. First and second coupling regions 770,780 are defined in the area where the first and second connectors 820,830 are relatively close to each other, and the remaining area is defined as a non-coupling region. Further, first and second chirped fiber gratings 790,800 are formed in the non-coupling region.

During operation, the amplified optical signal is applied to the first coupling region 770 via the first erbium-doped fiber 720. Since the first end is coupled from the first connector 820 to the second connector 830, the amplified optical signal will be applied to the second connector. However, since the coupling rate at the first coupling region 770 is set to about 50%, part of the coupled optical signal is reflected from the second chirped fiber gratings 800 and lost at the second end. The remaining optical signal is applied to the second erbium-doped fiber 860 via the second coupling region 780 and the fourth end. A coupling rate at the second coupling region 780 is set to about 50%. Therefore, the second erbium-doped fiber 860 will re-amplify the optical signal from the fourth end.

As described above, the gain flattening device for an optical fiber amplifier according to the present invention includes an optical coupling portion and chirped fiber gratings between first and second erbium-doped fibers and removes an optical signal reflected from the chirped fiber gratings at a drop end that is not connected to any other device. Therefore, the reflected optical signal can be blocked effectively even using a midway filter. Another advantage of the gain flattening device is that the use of the chirped fiber gratings leads to a merely slight change in output characteristics against temperature change and it is cost-effective because it is configured as a waveguide device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A gain flattening device for an optical fiber amplifier having first and second amplification fibers for amplifying input optical signals by induced emission of excited ions, comprising:

a first end portion having first and second ends for receiving an amplified optical signal from the first amplification fiber via the first end;

a second end portion having third and fourth ends for outputting a part of the amplified optical signal to the second amplification fiber via the fourth end; and an optical coupling portion between the first and second end portion having a first connector for connecting the first end to the third end, a second connector for connecting the second end to the fourth end, and at least one reflective grating, the optical coupling portion for coupling the amplified optical signal from the first connector to the second connector in a first coupling region that includes a common adjacent length of the first and second connectors such that the first and second connectors are closer to each other over said common adjacent length than in any other area, and outputting a second part of the amplified optical signal reflected from the reflective grating via the second end.

2. The gain flattening device of claim 1, wherein the at least one reflective grating is formed in the first coupling region.

3. The gain flattening device of claim 1, wherein the at least one reflective grating has a predetermined gain at a predetermined wavelength band.

4. The gain flattening device of claim 1, wherein the first coupling region has a coupling rate of about one-hundred percent.

5. The gain flattening device of claim 1, which further includes a second coupling region.

6. The gain flattening device of claim 5, wherein the at least one reflective grating is disposed between the first and second coupling region.

7. A gain flattening device for an optical fiber amplifier having first and second amplification fibers for amplifying input optical signals by induced emission of excited ions, comprising:

a first end portion having first and second ends for receiving an amplified optical signal from the first amplification fiber via the first end;

a second end portion having third and fourth ends for outputting a part of the amplified optical signal to the second amplification fiber via the fourth end;

an optical coupling portion between the first and second end portion having a first connector for connecting the first end to the third end, a second connector for connecting the second end to the fourth end, and at least one reflective grating, the optical coupling portion for coupling the amplified optical signal from the first connector to the second connector in a first coupling region that includes a common adjacent length of the first and second connectors such that the first and second connectors are closer to each other over said common adjacent length than in any other area, and outputting a second part of the amplified optical signal reflected from the reflective grating via the second end; and a second coupling region, wherein the first and second coupling regions each have a coupling rate of about fifty percent.

8. An optical fiber amplifier, comprising:

a first amplification fiber;

a second amplification fiber; and, a gain flattening device including:

a first end portion having first and second ends for receiving an amplified optical signal from the first amplification fiber via the first end;

a second end portion having third and fourth ends for outputting a part of the amplified optical signal to the second amplification fiber via the fourth end; and an optical coupling portion between the first and second end portion having a first connector for connecting the first end to the third end, a second connector for connecting the second end to the fourth end, and at least one reflective grating, the optical coupling portion for coupling the amplified optical signal from the first connector to the second connector in a first coupling region that includes a common adjacent length of the first and second connectors such that the first and second connectors are closer to each other over said common adjacent length than in any other area, and outputting a second part of the amplified optical signal reflected from the reflective grating via the second end.

9. The amplifier of claim 8, wherein the at least one reflective grating is formed in the coupling region.

10. The amplifier of claim 8, wherein the at least one reflective grating has a predetermined gain at a predetermined wavelength band.

11. The amplifier of claim 8, wherein the first coupling region has a coupling rate of about one-hundred percent.

12. The amplifier of claim 8, which further includes a second coupling region.

13. The amplifier of claim 12, wherein the at least one reflective grating is disposed between the first and second coupling region.

14. An optical fiber amplifier, comprising:
a first amplification fiber;
a second amplification fiber; and,
a gain flattening device including a first connector coupled to the first amplification fiber, a second connector coupled to the second amplification fiber, a first coupling region for coupling an optical signal from the first connector to the second connector and at least one reflective grating for reflecting a part of the optical signal away from the second amplification fiber, said amplifier further including a second coupling region, wherein the first and second coupling regions each have a coupling rate of about fifty percent.

* * * * *